United States Patent Office 3,307,092
Patented Feb. 28, 1967

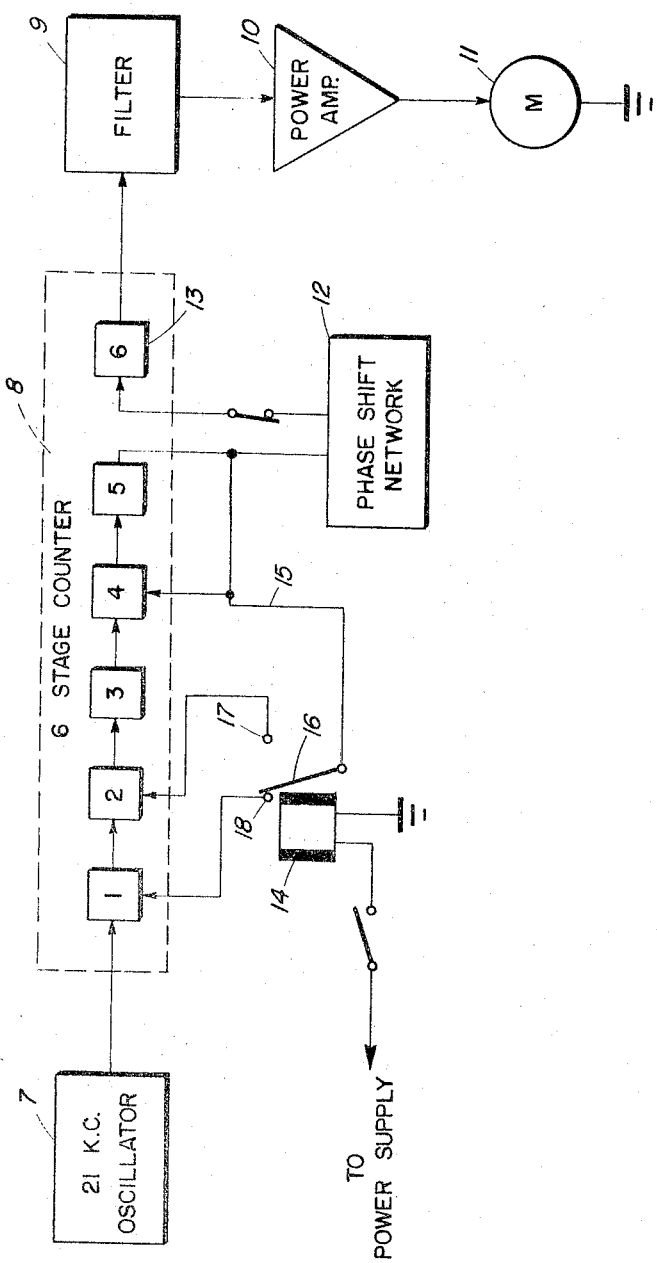

3,307,092
SPEED CONTROL CIRCUIT FOR A SYNCHRONOUS MOTOR
Robert V. Trocchio, Syosset, N.Y., assignor, by mesne assignments, to the United States of America as represented by the Secretary of the Navy
Filed Oct. 31, 1963, Ser. No. 320,591
6 Claims. (Cl. 318—171)

The present invention relates to synchronous motor speed control and more specifically to a novel variable frequency driving circuit for temporarily increasing the applied frequency of the motor input driving signal for enabling a synchronous motor to maintain its synchronous speed under varying load conditions.

Many classes of synchronous motors exhibit low torque at speeds slightly below synchronous speed. This phenomena requires that the power supplied to the motor to achieve synchronism be greater than the power required to maintain operation at synchronous speed. Various methods of supplying the additional power required to attain synchronism have been utilized in prior art systems; however, these methods necessitate the use of higher power components with a resultant increase in size, weight, and cost. The increased power input driving circuits for synchronous motors are required to have a greater capacity than the peak output capacity of the motor in order to achieve synchronism over the entire operating range of the motor.

Other prior art systems which have employed a variable frequency input to control the synchronism of a synchronous motor have used a single variable frequency oscillator or seperate fixed frequency oscillators to drive thyratron inverter circuits or the like for supplying a high power variable frequency signal to the motor. The variable frequency oscillator possesses the inherent limitation of frequency drift and separate oscillators require switching therebetween when a change in frequency to any one of a desired plurality of frequencies is required. In the latter instance the number of frequencies available is limited by the number of fixed frequency oscillators present.

The present invention overcomes the obvious disadvantages of such a control system by employing a fixed frequency oscillator to drive a multi-stage digital counter having a variable count rate and which may be switched from a first count rate to any one of a number of preselected count rates for controlling the frequency of the signal applied to a synchronous motor. The proposed method of attaining synchronous speed does not require an increase in driving power and thereby reduces the power requirements of the driving circuitry. The low torque characteristic of the synchronous motor, particularly in the vinicity of synchronous speed, is overcome by temporarily increasing the applied frequency. This will cause the motor to accelerate to a new speed which is less than the new synchronous speed. This new speed, however, is greater than the original synchronous speed and once this new speed is reached the input frequency to the motor may be lowered to the original value thereby causing the motor to decelerate to the originally desired synchronous speed.

The specific nature of the invention, as well as other objects, aspects, uses and advantages thereof, will clearly appear from the following description and from the accompanying drawing in which the sole figure is a block diagram of the preferred embodiment of the invention.

Referring now to the drawing there is shown a six-stage digital counter 8 interposed between a 21 kc. oscillator 7 and a synchronous motor 11 whose speed is to be controlled. The digital counter 8 has a feedback circuit between stage 5 and stages 1 and 2 which includes conductor 15 and a time delay switching relay 14 operable to selectively connect the output of stage 5 to either stage 1 or stage 2. It should be noted for the given case the output of counter stage 5 is fed back to the input of stage 4, regardless of the relay position. With contact arm 16 of the time delay relay 14 on contact 18, the first stage of the six-stage counter 8 has applied thereto feedback pulses from stage 5 to provide the normal running frequency of 456 c.p.s. The effect of the feedback pulses is to increase the count rate over that of the six-stage counter employing no feedback. Upon switching contact 16 to contact 17, the feedback pulse is applied to stage 2 of the six-stage counter to provide a high starting or resynchronization driving frequency of 477 c.p.s. The application of this higher driving frequency to the motor causes the motor to accelerate to the speed slightly less than the synchronous speed of 9540 r.p.m. for this frequency. After such acceleration the time delay relay 14 reverts contact 16 to its normal position at contact 18 with a consequent decrease in frequency and reduction in motor speed. The synchronous speed of rotation at this normal frequency is 9100 r.p.m. The motor would therefore decelerate from approximately 9500 to 9100 r.p.m. and synchronize at the normal running speed. The system remains in this condition until the motor once again drops below synchronous speed and thereafter the cycle may be repeated.

The six-stage digital counter is a standard six-stage counter whose function is that of a frequency divider. The filter 9 is employed for converting the digital output of the counter 8 to a sine wave signal and is preferably a low-pass filter which passes only the fundamental frequency of the square wave output of counter stage 6. The power amplifier 10 provides the necessary power to drive the synchronous motor 11.

The phase shift network may be connected between counter stages 5 and 6 if desired to provide a fine phase adjustment in the output of the six-stage counter circuit.

Obviously many modifications may be made in the illustrative embodiment of the invention without departing from the spirit and the scope of the appended claims. The invention is not limited to the particular counter shown or the values of speed and frequency used in illustrating how the speed for a particular synchronous motor has been controlled. It is therefore to be understood that within the scope of the appended claims, the invention may be practiced otherwise than as specifically described.

I claim:
1. A speed control system for a synchronous motor comprising:
   a fixed frequency oscillator,
   a variable count multi-stage digital counter circuit having its input coupled to the output of said oscillator and providing an output pulse upon receiving a predetermined number of pulses at the input thereof,
   means coupled to said counter circuit for varying the number of input pulses required to produce an output pulse including a feedback control circuit having one end connected to the output of one stage in said counter and switching means for selectively connecting the other end of said feedback control circuit to one of a plurality of preceding counter stages for varying the output frequency of said counter circuit as said other end of said feedback control circuit is switched from one counter stage to another counter stage, and
   means coupling the output of said counter circuit to a synchronous motor whereby an increase in output frequency of said counter circuit may be employed to increase the speed of said synchronous motor to its synchronous speed.

2. The system of claim 1 wherein said switching means comprises
 a time delay relay for switching said other end of said feedback control circuit from one counter stage to another counter stage a sufficient time after an increase in output frequency of said counter circuit for said synchronous motor to obtain its synchronous speed.

3. The system of claim 2 wherein said binary counter stage further includes
 a phase shift network coupled between two stages for providing a phase adjustment for a pulse train in said digital counter circuit.

4. An improved synchronous motor speed control system having a variable frequency output connectable to a synchronous motor for maintaining said synchronous motor at its synchronous speed comprising,
 a fixed frequency oscillator,
 a multi-stage digital counter circuit having its input connected to the output of said oscillator,
 a feedback control loop connected to the output of one stage of said counter circuit, and
 switching means within said feedback control loop for selectively connecting the output of said one stage to one of a plurality of preceding stages for varying the output frequency of said counter,
 filter means connected to the output stage of said digital counter for converting the digital output of said counter into a sine wave signal and supplying said synchronous motor with a variable frequency driving signal.

5. The system of claim 4 wherein said switching means consists of a time delay relay for switching the output of said one stage to either one of two preceding cascaded binary counter stages within said binary counter circuit for varying the frequency of the output of said counter circuit whereby the count rate of said counter is changed during said last named switching.

6. The system of claim 5 wherein a phase shift network is coupled between a pair of cascaded stages within said counter circuit for providing a fine phase adjustment for pulses passing through said counter.

References Cited by the Examiner

UNITED STATES PATENTS

| | | | |
|---|---|---|---|
| 2,852,726 | 9/1958 | Ocnaschek | 318—171 |
| 2,923,871 | 2/1960 | Cohen | 318—171 |
| 2,945,997 | 7/1960 | Kennedy | 318—171 X |
| 3,042,819 | 7/1962 | Kennedy | 310—49 |

OTHER REFERENCES

Millman and Taub, Pulse and Digital Circuits, N.Y., McGraw-Hill, 1956, pp. 327–335.

ORIS L. RADER, *Primary Examiner.*

G. A. FRIEDBERG, G. Z. RUBINSON,

*Assistant Examiners.*